US008639279B2

(12) United States Patent
Zhou et al.

(10) Patent No.: US 8,639,279 B2
(45) Date of Patent: Jan. 28, 2014

(54) METHOD OF REQUESTING A COMMUNICATION SESSION USING SEGMENTED SIGNALING MESSAGES

(71) Applicant: Sprint Spectrum L.P., Overland Park, KS (US)

(72) Inventors: Tong Zhou, Lower Gwynedd, PA (US); Ronald E. Lewis, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/852,356

(22) Filed: Mar. 28, 2013

(65) Prior Publication Data

US 2013/0210476 A1 Aug. 15, 2013

Related U.S. Application Data

(63) Continuation of application No. 11/287,955, filed on Nov. 28, 2005, now Pat. No. 8,463,307.

(51) Int. Cl.
*H04B 7/00* (2006.01)

(52) U.S. Cl.
USPC .......................................... 455/518; 455/519

(58) Field of Classification Search
USPC .................... 455/518–521; 709/227
See application file for complete search history.

(56) References Cited

U.S. PATENT DOCUMENTS

| 6,424,828 | B1 | 7/2002 | Collins et al. |
| 6,424,835 | B1 | 7/2002 | Shin |
| 6,601,099 | B1 | 7/2003 | Corneliussen |
| 7,218,626 | B2 | 5/2007 | Shaheen et al. |
| 7,218,923 | B2 | 5/2007 | Hartikainen et al. |
| 7,542,481 | B2 * | 6/2009 | Faccin et al. .................. 370/469 |
| 7,830,894 | B2 | 11/2010 | Bouat |
| 8,463,307 | B1 | 6/2013 | Zhou et al. |
| 2003/0148785 | A1 | 8/2003 | Mangal et al. |
| 2004/0028080 | A1 | 2/2004 | Samarasinghe et al. |
| 2004/0107235 | A1 * | 6/2004 | Koskelainen .................. 709/200 |
| 2004/0121791 | A1 | 6/2004 | May et al. |
| 2004/0176115 | A1 | 9/2004 | Atkin et al. |
| 2004/0192363 | A1 * | 9/2004 | Rosetti et al. .................. 455/509 |
| 2004/0219940 | A1 | 11/2004 | Kong et al. |
| 2005/0091379 | A1 | 4/2005 | Kim et al. |
| 2005/0099998 | A1 | 5/2005 | Semper |

(Continued)

OTHER PUBLICATIONS

SIP Basics, Dennis Baron, Jul. 20, 2005.*
Dennis Baron, "SIP Basics," SIP.edu Workshop, Massachusetts Institute of Technology, Jul. 20, 2005.

(Continued)

*Primary Examiner* — Raymond Dean

(57) ABSTRACT

An originating mobile station seeks to establish a push-to-talk (PTT) communication session with a destination mobile station. To do this, the originating mobile station transmits a first request message that requests the PTT session. Before receiving a predefined indication that the requested PTT session has been accepted, the originating mobile station transmits a first continuation message that includes first session description information to facilitate establishment of the PTT session. A PTT server receives the first request message and, before receiving the first continuation message, transmits to the destination mobile station a second request message that requests the PTT session. The PTT server then transmits a second continuation message that includes second session description information. The destination mobile station receives the second request message and, before receiving the second continuation message, transmits an acceptance message indicating acceptance of the requested PTT session.

20 Claims, 2 Drawing Sheets

(56) References Cited

U.S. PATENT DOCUMENTS

2005/0105511 A1    5/2005    Poikselka
2006/0109837 A1    5/2006    Saha et al.
2006/0111128 A1    5/2006    Harris et al.
2009/0109957 A1*    4/2009    Caradec et al. ............... 370/352

OTHER PUBLICATIONS

J. Rosenberg et al., "SIP: Session Initiation Protocol," Request for Comments 3261, Network Working Group, Jun. 2002.

M. Handley et al., "SDP: Session Description Protocol," Request for Comments 2327, Network Working Group, Apr. 1998.

* cited by examiner

METHOD OF REQUESTING A COMMUNICATION SESSION USING SEGMENTED SIGNALING MESSAGES

CROSS-REFERENCE TO RELATED APPLICATIONS

This application is a continuation of U.S. patent application Ser. No. 11/287,955, filed Nov. 28, 2005, which application is incorporated herein by reference.

BACKGROUND

1. Field of the Invention

The present invention relates to telecommunications and, more particularly, to a method of requesting a communication session, such as a "push-to-talk" (PTT) session, using segmented signaling messages.

2. Description of Related Art

Mobile stations are increasingly being used to send and receive real-time media, such as voice and/or video, in a packet-data format. For example, a mobile station may use the Real-Time Transport Protocol (RTP) to send and receive such packetized media.

In order for a mobile station to establish RTP communication with an endpoint, the mobile station may engage in signaling, for example, using the Session Initiation Protocol (SIP). To request a communication session, the originating mobile station may send to a SIP proxy server a SIP INVITE message that designates a terminating endpoint, e.g., a destination mobile station. The INVITE may include a Session Description Protocol (SDP) block that characterizes the proposed session as an RTP session. The proxy server may then query a SIP registry to determine an IP address of the destination mobile station. The proxy server may then forward the INVITE to that address. The destination mobile station may agree to establish the session by sending a SIP 200 OK message via the proxy server to the originating mobile station. The originating mobile station may then send a SIP ACK message via the proxy server to the destination mobile station. At that point, the originating mobile station and destination mobile station may begin to communicate RTP packets with each other.

The originating mobile station may also be able to establish the session through a media server. The media server may function to set up respective RTP sessions or "legs" with the originating mobile station and one or more destination mobile stations. The media server may also conference the various legs together.

A wireless service provider may establish sessions through a media server in order to provide a "Push-to-talk" (PTT) service that simulates the experience of two-way radio communication. For example, a PTT-capable mobile station may include a button or other mechanism that the user can actuate in order to initiate a PTT session with a designated group of one or more other users. When the user presses the PTT button, a PTT client application in the mobile station may responsively send an INVITE message to a proxy server. The proxy server may then forward the INVITE message to a PTT server, e.g., a media server that runs a PTT application.

The INVITE message may identify a "communication group" for the user, i.e., a group of other users with whom the initiating user would like to communicate. The PTT server may then set up RTP legs with the initiating user and with each member of the group. The PTT server may then conference the RTP legs together so as to allow the members of the group to communicate with each other and with the initiating user.

Latency can be a problem with this approach, however. For example, a period of several seconds may pass after the user of the originating mobile station presses the PTT button before the PTT session with the designated group is fully established. This several second delay can result from a number of factors including (i) the time it takes for the originating mobile station to acquire a radio link and/or data link so as to be able to transmit the SIP INVITE message; (ii) the time it takes for the SIP INVITE message to propagate to the destination mobile stations; (iii) the time it takes for each destination mobile station to respond to the SIP INVITE message, e.g., with a 200 OK message. In addition, if a destination mobile station is in a dormant state, then additional time is required for the destination mobile station to acquire a radio link to receive the SIP INVITE message.

Accordingly, there is a need to provide methods for reducing the time it takes to establish communication sessions.

SUMMARY

In a first principal aspect, an exemplary embodiment of the present invention provides a method of requesting a communication session. In accordance with the method, a first message is transmitted, wherein the first message requests establishment of the communication session and includes first information to facilitate establishment of the communication session. Before receiving a predefined indication that the communication session has been accepted, a second message is transmitted. The second message includes second information to facilitate establishment of the communication session.

In a second principal aspect, an exemplary embodiment of the present invention provides a method for push-to-talk (PTT) communication. In accordance with the method, a media server receives a first request message that requests establishment of a PTT session involving an originating mobile station and at least one destination mobile station. The first request message also indicates that a first continuation message will follow. Before the media server receives the first continuation message, the media server transmits a second request message to the at least one destination mobile station. The second request message requests establishment of the PTT session. The second request message also indicates that a second continuation message will follow. The media server receives the first continuation message and responsively transmits the second continuation message to the at least one mobile station.

In a third principal aspect, an exemplary embodiment of the present invention provides a method of establishing a communication session. In accordance with the method, a destination mobile station receives a request message. The request message requests a communication session and indicates that a continuation message will follow. Before the destination mobile station receives the continuation message, the destination mobile station transmits an acceptance message indicating acceptance of the communication session. The destination mobile station receives the continuation message, which includes session description information. The destination mobile station establishes the communication session based on the session description information.

DETAILED DESCRIPTION OF EXEMPLARY EMBODIMENTS

1. Overview

Figure 1:
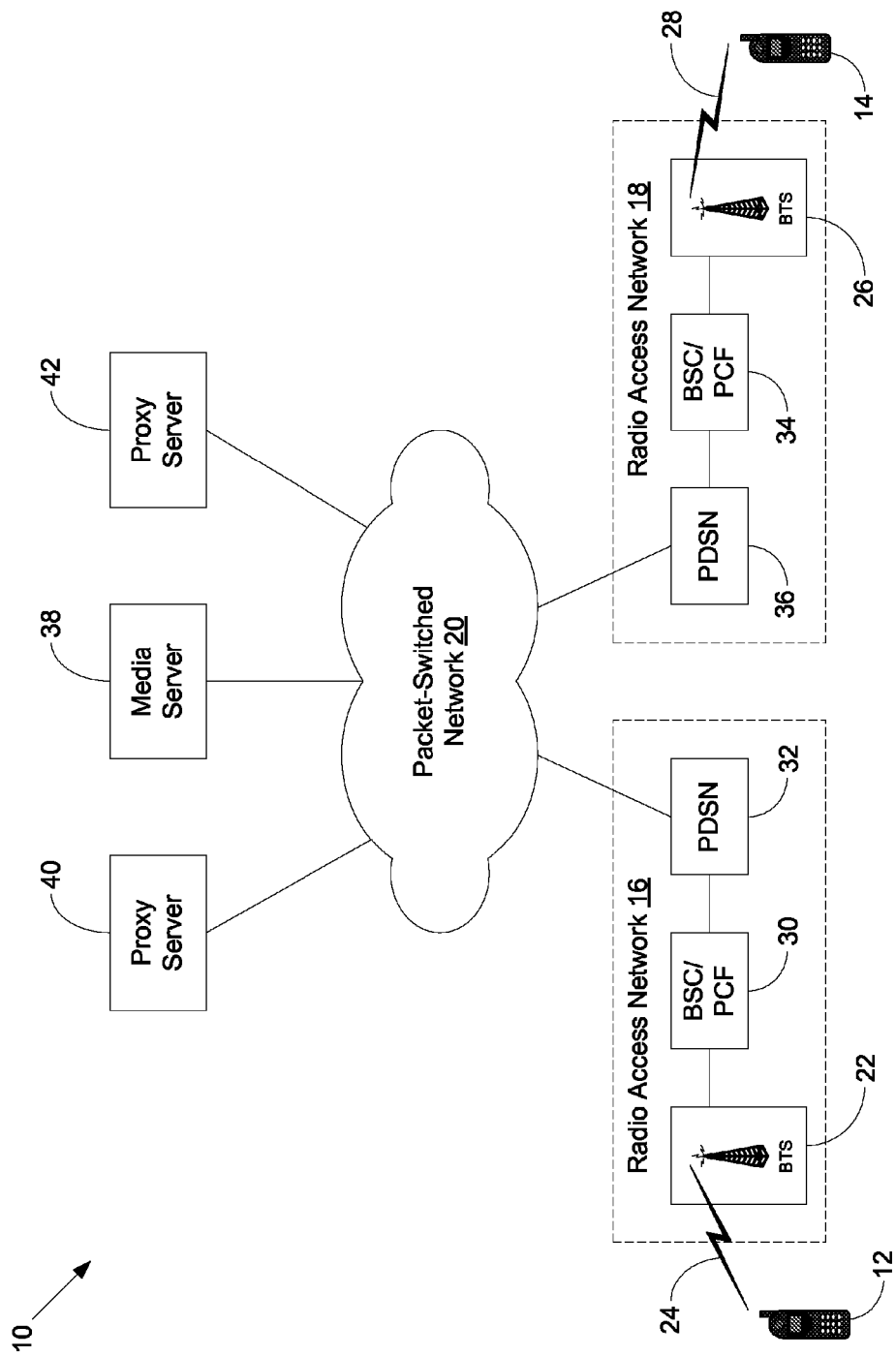
FIG. 1 is a simplified block diagram of a wireless telecommunications network, in accordance with an exemplary embodiment of the present invention.

The present invention, in exemplary embodiments, provides methods of requesting and establishing a communication session. The communications session could be, for example, a push-to-talk (PTT) session involving mobile stations. Alternatively, the communication session could be a voice-over-Internet Protocol (VoIP) session, IP multimedia session, video session, or other type of session. In addition, endpoints other than mobile stations could be involved in the communication session.

Mobile stations involved in the communication session could be wireless devices, such as wireless telephones, wireless PDAs, or wirelessly-equipped laptop computers, that send and receive voice or other media in a packetized format via an air interface. For example, a mobile station may communicate with a radio access network (RAN) that is coupled to a packet-switched transport network, and the mobile station and RAN may use IS-2000 (1xRTT), IS-856 (EV-DO), or other protocol for communications over the air interface.

A PTT session may involve a PTT server, e.g., a media server that runs a PTT application, coupled to the packet-switched network. Voice or other media may be exchanged in the PTT session through multiple media streams. For example, the PTT server may function as a conference bridge, maintaining a media stream with each mobile station involved in the PTT session. The voice or other media may be carried in a media stream in a real-time packet format, for example, using the Real-Time Transport Protocol (RTP). A signaling protocol, such as the Session Initiation Protocol (SIP), may be used to establish the media streams. A recent version of SIP is described in J. Rosenberg et al., "SIP: Session Initiation Protocol," Request for Comments 3261 (June 2002), which is incorporated herein by reference.

For example, an originating mobile station may request establishment of a PTT session with one or more destination mobile stations. To do this, the originating mobile station may use a signaling protocol, e.g., SIP, to transmit various types of information that facilitate the establishment of the PTT session. Such information may include, for example, an identification of the originating mobile station, identifications of the one or more destination mobile stations, authentication information for authenticating the originating mobile station, and session description information that describes the requested session, e.g., using the Session Description Protocol (SDP). A recent version of SDP is described in M. Handley et al., "SDP: Session Description Protocol," Request for Comments 2327 (April 1998), which is incorporated herein by reference.

In an exemplary embodiment, this information is segmented or distributed among multiple messages. For example, the originating mobile station may transmit a first message that includes first information for facilitating establishment of the PTT session, and thereafter transmit a second message that includes second information for facilitating establishment of the PTT session. The first message could be, for example, a SIP INVITE message. The first information may include an identification of the originating mobile station, identifications of one or more destination mobile stations, and an identification of a PTT application. The second message could be a continuation message, for example, a SIP message with "INVITE-C" as the method name to indicate that it is a continued INVITE message. The second information included in the continuation message may include authentication information, session description information, and/or other types of information that may facilitate establishment of the PTT sessions.

In order to correlate the INVITE and the INVITE-C messages together, the INVITE message may include a field that indicates how many INVITE-C messages will follow. The INVITE message may also include a linking identifier (e.g., in a "Call-ID" field) to link the INVITE message with the one or more subsequent INVITE-C messages. The one or more INVITE-C messages that follow the INVITE message may include the same linking identifier.

This approach of segmenting or distributing information among multiple messages may beneficially reduce latency in establishing a PTT session. In particular, the transmission time for a SIP message is typically related to the size of the message. Thus, by reducing the amount of information contained in the initial SIP INVITE message, the message may reach the PTT server and, thereafter, the one or more destination mobile stations more quickly.

In addition, the information contained in the continuation message or messages (e.g., authentication information and/or session description information) can be processed while the PTT server is waiting for the one or more destination mobile stations to receive and respond to the initial SIP INVITE message. For example, if a destination mobile station is in a dormant state, then it would need to acquire a radio link before receiving the initial SIP INVITE message. This process of acquiring a radio link for a dormant destination mobile station typically accounts for a significant portion of the overall delay in setting up a PTT session. By having it occur at the same time other processing functions occur, the overall delay may be reduced.

To reduce delay even further, the originating mobile station may transmit an INVITE-C before the originating mobile station receives a predetermined response to the original INVITE message. The predetermined response could be, for example, a "provisional," SIP 1xx response or a "successful," SIP 2xx response. Thus, the originating mobile station may send an INVITE-C message before receiving a SIP 100 Trying message and/or before receiving a SIP 200 OK message in response to the original SIP INVITE message. Similarly, the PTT server may receive the INVITE message and forward it to the one or more destination mobile stations before the PTT server receives the INVITE-C message. Once the PTT server receives the INVITE-C message from the originating mobile station, the PTT server may send its own INVITE-C messages to the one or more destination mobile stations.

As yet another way to reduce delay, a destination mobile station may transmit an acceptance message when it receives the original INVITE message requesting the PTT session, without waiting to receive the INVITE-C message. The acceptance message could be, for example, a "provisional," SIP 1xx response or a "successful," SIP 2xx response (e.g., a SIP 200 OK response). The destination mobile station may accept the original INVITE message based on the PTT server and/or on the PTT application identified in the message. For example, the particular PTT server and/or PTT application may be sufficiently "well known" to the destination mobile station that a complete session description may be unnecessary. In some cases, the destination mobile station may be able to apply a set of default parameters for the session.

2. Exemplary Network Architecture

FIG. 1 illustrates an exemplary wireless telecommunications system 10. In an exemplary embodiment, system 10 provides mobile stations, such as mobile stations 12 and 14, with wireless packet-based communication service, through which the mobile stations may send and receive voice, data, video and/or other media via an air interface. Mobile stations 12 and 14 could be, for example, wireless telephones, wireless personal digital assistants (PDAs) or other wireless communication devices. Mobile stations 12 and 14 may wirelessly communicate with radio access networks (RANs) 16 and 18, which, in turn, may be communicatively coupled to a packet-switched network 20. The communications between mobile stations 12 and 14 and RANs 16 and 18 may use an air interface protocol such as IS-2000 (1xRTT) or IS-856 (EV-DO).

RAN 16 and 18 may each include one or more base transceiver stations (BTSs) that provide wireless coverage areas for communication with mobile stations. Thus, RAN 16 may include a BTS 22 that communicates with mobile station 12 over an air interface 24, and RAN 18 may include a BTS 26 that communications with mobile station 14 over an air interface 28. The BTSs may be controlled by base station controllers (BSCs) with packet control functions (PCFs), which, in turn, may be communicatively coupled to packet-switched network 20 via packet data serving nodes (PDSNs). Thus, BTS 22 may be coupled to BSC/PCF 30, which may be coupled to PDSN 32, and BTS 26 may be coupled to BSC/PCF 34, which may be coupled to PDSN 36. PDSNs 32 and 36 may provide RANs 16 and 18, respectively, with access to packet-switched network 20.

Packet-switched network 20 may include a wide area network, such as the Internet, that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 20 in a real-time format. Other protocols, such as the Session Initiation Protocol (SIP), may be used to set up and/or manage communication sessions through packet-switched network 20.

Such communication sessions may include push-to-talk (PTT) sessions between two or more mobile stations, e.g., between mobile stations 12 and 14. A PTT session is typically intended to simulate the experience of two-way radio communication. Thus, a user of an originating mobile station may be able to press a PTT button and begin talking so that the user's speech is conveyed (with some latency) to a particular, destination mobile station or to a group of destination mobile stations (e.g., as specified in a buddy list or group call list). To facilitate such PTT sessions, wireless telecommunications system 10 may include a media server 38 that is communicatively coupled to packet-switched network 20. Media server 38 may be able to run a PTT application so as to function as a PTT server. It is to be understood, however, that media server 38 may also be able to run other applications and to serve other functions.

As a PTT server, media server 38 may serve as the anchor point for the signaling used to set up PTT sessions and for the media streams that are conveyed during the PTT session. Thus, to initiate a PTT session, an originating mobile station (e.g., mobile station 12) may signal to media server 38. Media server 38 may then engage in signaling with the one or more destination mobile stations (e.g., mobile station 14). In this way, a media stream may be established between media server 38 and the originating mobile station, and one or more media streams may be established between media server 38 and the one or more destination mobile stations, with media server 38 conferencing the various media streams together.

The signaling between the originating mobile station and media server 38 may be conveyed via one or more proxy servers, and the signaling between the destination mobile station may be conveyed via one or more proxy servers. Thus, the signaling between mobile station 12 and media server 38 may be conveyed via a proxy server 40, and the signaling between mobile station 14 and media server 38 may be conveyed via proxy server 42. In an exemplary embodiment, each proxy server serves a particular area. Thus, proxy server 40 may serve RAN 16, and proxy server 42 may server RAN 18.

3. Exemplary Signaling

Figure 2:
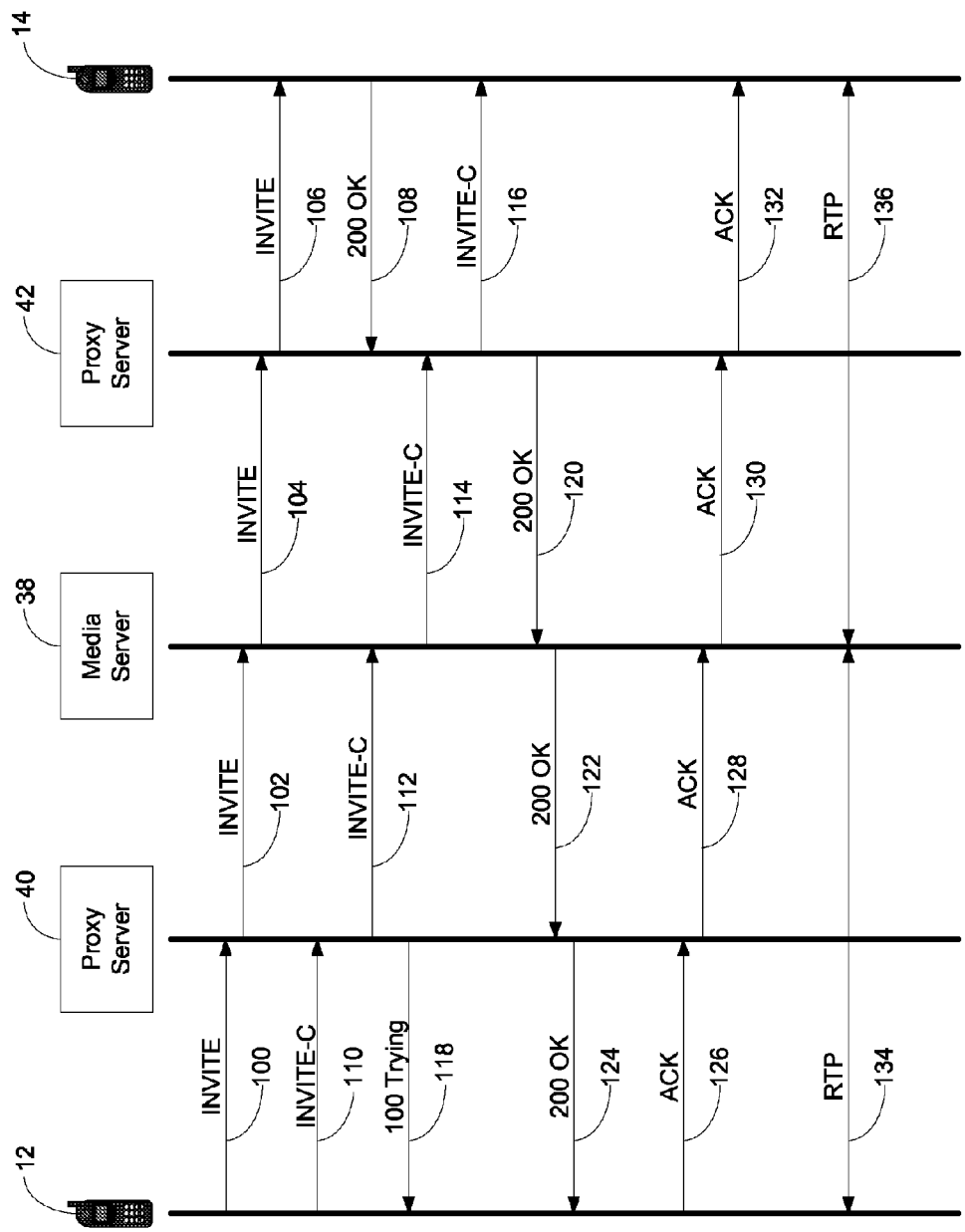
FIG. 2 is a simplified call flow diagram illustrating establishment of a push-to-talk (PTT) session between an originating mobile station and a destination mobile station, in accordance with an exemplary embodiment of the present invention.

FIG. 2 is a simplified call flow diagram showing exemplary signaling for establishment of a PTT session between mobile station 12 (as the originating mobile station) and mobile station 14 (as the destination mobile station) using media server 38 as PTT server. Although this call flow diagram illustrates an example in which SIP signaling is used, it is to be understood that other types of signaling could be used. In addition, this example assumes that the signaling between mobile station 12 and media server 38 is conveyed via proxy server 40, and the signaling between mobile station 14 and media server 38 is conveyed via proxy server 42. It is to be understood, however, that this arrangement of proxy servers is exemplary only. Thus, the signaling may be conveyed via a greater or fewer number of proxy servers. In addition, the signaling to and from the originating and destination mobile station could be conveyed via the same proxy server.

The process may begin when the user interacts with a user interface of mobile station 12 to select one or more destination mobile stations and indicates that a PTT session is desired, for example, by actuating pressing and holding a "Push-to-talk" button. The user may select one or more destinations by selecting directory numbers, names, group lists, or in other ways. In response to the user's selection of one or more destinations and actuation of the "Push-to-talk" button, a user agent function of mobile station 12 may begin the process of requesting establishment of a PTT session. Before the PTT session is established, the user may begin speaking, e.g., into a microphone of mobile station 12. The user's speech may be buffered in mobile station 12 until the PTT session is established.

To request establishment of a PTT session, mobile station 12 may transmit information that is segmented or distributed among one or more SIP messages. In the example of FIG. 2, mobile station 12 includes first information in an INVITE message and includes second information in a subsequent INVITE-C message. It is to be understood that this segmentation is exemplary only. For example, mobile station 12 may use more than one INVITE-C message to convey the information. Alternatively, instead of following the initial INVITE message with one or more INVITE-C messages, mobile station 12 may follow the initial INVITE message with one or more additional INVITE messages or with other types of SIP messages.

In the example illustrated in FIG. 2, mobile station 12 makes the initial request for establishment of a PTT session by transmitting a SIP INVITE message that is received by proxy server 40, as indicated by step 100. The INVITE message may include certain information to facilitate establishment of the PTT session. For example, the INVITE message may identify mobile station 12 as the originating mobile station, e.g., by including its network access identifier (NAI) and/or mobile directory number (MDN) in a "From" field. The SIP INVITE message may also identify mobile station 14 as the destination, e.g., by including the MDN of mobile station 14 in a "To" field. The INVITE message may also identify a specific PTT application, e.g., in an "App-ID" field, as the application that is being invoked.

To facilitate the use of "INVITE-C" continuation messages to provide additional information, the INVITE message may also include an indication that of how may INVITE-C messages will follow. In this example, the INVITE message may include an indication that one INVITE-C message will follow. The INVITE message may also include a linking identifier, e.g., in a "Call-ID" field, that can be used to correlate the INVITE and INVITE-C messages together. In an exemplary embodiment, the linking identifier is a unique identifier that mobile station 12 generates for the PTT session. For example, mobile station 12 may use its IP address in combination with a random string as the linking identifier.

Proxy server 40 may receive the INVITE message of step 100, process it, and then forward it onto media server 38, as indicated by step 102. As part of the processing of the INVITE message of step 100, proxy server 40 may modify the message, for example by adding information to and/or removing information from the message. As one example, proxy server 40 may add its IP address in a "Via" field. As another example, proxy server 40 may add a "Record-Route" field with its SIP address to the message, e.g., in order to remain in the signaling path for future messages associated with establishing the PTT session. It is to be understood that these modifications are meant to be exemplary only, as proxy server 40 may add other types of information or modify the message in other ways.

Media server 38 receives the INVITE message of step 102 and determines that a PTT application is being invoked, e.g., based on a PTT application being identified in an "App-ID" field. In response, media server 38 formulates a SIP INVITE message to be sent to destination mobile station 14. Once formulated, media server 38 may transmit the INVITE message to proxy server 42, as indicated by step 104. In this example, media server 38 selects proxy server 42 as the destination because proxy server 42 serves RAN 18, where destination mobile station 14 is operating.

To formulate the INVITE message of step 104, media server 38 may copy some of the information contained in the INVITE message it received in step 102. For example, the INVITE message of step 104 may identify mobile station 12 as the originating mobile station in a "From" field and may identify mobile station 14 as the destination mobile station in a "To" field, in a similar manner as in the INVITE message of step 102. However, media server 38 may also include different information in the INVITE message of step 104. In particular, media server 38 may include a different linking identifier, e.g., in a "Call-ID" field. Media server 38 may generate this linking identifier based on its IP address in combination with a random string. The INVITE message of step 104 may also identify a particular PTT application that is being invoked, e.g., in an "App-ID" field. The message may also identify media server 38 as the originator of the message, e.g., in a "Via" or "Contact" field.

Proxy server 42 may receive the INVITE message of step 104, process it, and then forward it to mobile station 14, as indicated by step 106. As part of the processing of the INVITE message of step 106, proxy server 42 may modify the message, for example by adding information to and/or removing information from the message. For example, proxy server 42 may replace any "Via" fields with a "Via" field containing its own IP address.

In an exemplary embodiment, the INVITE message of step 106 does not contain all of the information needed to establish the PTT session. For example, the INVITE message may lack session description information. Nonetheless, mobile station 14 may respond to the INVITE message of step 106 with a SIP 200 OK message, as indicated by step 108. The 200 OK message indicates that mobile station 14 has accepted the requested PTT session. Mobile station 14 may accept the session, despite the lack of session description information, based on an identification of media server 38, an identification of a PTT application, or other information contained in the INVITE message of step 106. In addition, mobile station 14 may not need to receive a complete session description, because mobile station 14 may be able to apply default parameters. In this regard, the 200 OK message of step 108 may include a session description based on these default parameters.

During the time that the original request from mobile station 12 is being propagated toward mobile station 14, mobile station 12 may formulate and transmit one or more continuation messages. For example, mobile station 12 may transmit an INVITE-C message to proxy server 40, as indicated by step 110. Mobile station 12 may populate the INVITE-C message with information that facilitates establishment of a PTT session but was not included in the INVITE message of step 100. In particular, the INVITE-C message may include session description information that describes various parameters for the desired PTT session, e.g., using the Session Description Protocol (SDP). The INVITE-C message may also include authentication information that another network element, e.g., proxy server 40 or content server 38, may use to authenticate mobile station 12 and to validate its request to establish a PTT session with mobile station 14.

To tie the INVITE-C message of step 110 with the INVITE message of step 100, the INVITE-C message may include the same linking identifier, e.g., in a "Call-ID" field. Because the INVITE-C message is linked to the INVITE message in this way, the INVITE-C may omit information that was already provided by the original INVITE message. For example, where the INVITE message has already identified the endpoints of the requested PTT session, e.g., mobile station 12 in a "From" field and mobile station 14 in a "To" field, the INVITE-C message may omit this information.

Proxy server 40 may receive and process the INVITE-C message of step 110. For example, proxy server 40 may use the authentication information contained in the message to try to validate the PTT request from mobile station 12. If validation is successful, then proxy server 40 may modify and forward the INVITE-C message to media server 38, as indicated by step 112. Proxy server 40 may modify the INVITE-C message, for example, by adding a "Via" field that contains its IP address and by removing the authentication information.

Media server 38 receives the INVITE-C message of step 112 and uses the session description information to set up a communication session between media server 38 and mobile station 12 as one leg of the PTT session. Media server 38 also formulates its own INVITE-C message and transmits it to proxy server 42, as indicated by step 114. The INVITE-C message of step 114 may include session description information that describes a communication session between media server 38 and mobile station 14 as another leg of the PTT session. In addition, the INVITE-C message of step 114 may include the same linking identifier as in the INVITE message of step 104, so that these messages may be linked together.

Proxy server 42 may receive the INVITE-C message of step 114, modify it (e.g., by adding its IP address in a "Via" field) and forward it to mobile station 14, as indicated by step 116. At that point, mobile station 14 may finally have complete information regarding the requested PTT session, even though mobile station 14 already accepted the requested session by transmitting the 200 OK message in step 108.

At the same time that the INVITE-C message transmitted by mobile station 12 is propagating toward mobile station 14, other messages may be propagating toward mobile station 12. For example, as indicated by step 118, proxy server 40 may transmit a 100 Trying message to mobile station 12 in response to the INVITE message of step 100. Although FIG. 2 shows the 100 Trying message of step 118 as coming after the INVITE-C message of step 110, it is to be understood that step 118 could occur earlier or at the same time as step 110.

Mobile station 12 could respond to the 100 Trying message of step 118 in various ways. For example, in response to receiving the 100 Trying message, mobile station 12 could generate a beep or other signal to notify the user that the user can now begin speaking When the user begins speaking, mobile station 12 may store the audio in a buffer until the communication session is established.

While the INVITE-C message transmitted by mobile station 12 propagates toward mobile station 14, the 200 OK message that mobile station 14 transmitted in step 108 (in response to the INVITE message of step 106) may propagate toward mobile station 12. Thus, proxy server 42 may forward the 200 OK message to media server 38 (step 120), media server 38 may forward the 200 OK message to proxy server 40 (step 122), and proxy server 40 may forward the 200 OK message to mobile station 12 (step 124).

Once mobile station 12 receives the 200 OK message, it may transmit an acknowledgement, e.g., a SIP ACK message, to proxy server 40, as indicated by step 126. Proxy server 40 may forward the ACK message to media server 38 (step 128), media server 38 may forward the ACK message to proxy server 42 (step 130), and proxy server 42 may forward the ACK message to mobile station 14 (step 132). At that point, the PTT session may be established. Thus, mobile station 12 and media server 38 may exchange voice or other media in an RTP media stream 134, as a first leg of the PTT session, and mobile station 14 and conference 38 may exchange voice or other media in an RTP media stream 136, as a second leg of the PTT session. Media server 38 may function to conference these two legs together, so as to anchor the PTT session.

4. Exemplary Message Format

The following messages illustrate how an originating mobile station may distribute or segment information for facilitating establishment of a PTT session among two messages, namely, an INVITE message followed by an INVITE-C message. Thus, with reference to FIG. 2, the first message may correspond to the INVITE message of step 100, and the second message may correspond to the INVITE-C message of step 110.

The initial INVITE message that the original mobile station transmits may contain only minimal information. An example of such a message is as follows:

---

INVITE tel:9135374650 SIP/2.0
Via: SIP/2.0/UDP 63.168.237.92;branch=z9hG4bKXO2oP5O2-UA7;tok=1/com.sprintpcs/1
Max-Forwards: 70
To: <tel:9135374650>
From:
<sip:sanyoptt36@ptt.sprintpcs.com>;tag=40E24B35;mdn=9135114650
Expires: 11
Timestamp: 1090356285
Call-ID: 0001E894@63.168.237.92
CSeq: 14918561 INVITE
App-ID: PTTI
INVITE-C: 1

---

The information contained in this exemplary INVITE message is described below.

The first line of the message contains the method name (INVITE) followed by the Request-URI (tel:9135374650) and the protocol version (SIP/2.0). In this example, the Request-URI identifies the destination mobile station by its MDN.

The next field, the "Via" field, contains the protocol name and version (SIP/2.0), the transport protocol (UDP), the originating mobile station's IP address (63.168.237.92), a branch parameter that identifies the transaction (branch=z9hG4bKXO2oP5O2-UA7), and a tokenization capability parameter that indicates the originating mobile station's ability to handle tokenized SIP (tok=1/com.sprintpcs/1).

The "Max-Forwards" field includes an integer (70) that specifies the maximum number of hops the request can make on the way to its destination.

The "To" field contains the URL toward which the request is ultimately directed. In this case, the "To" field identifies the destination mobile station by its MDN (9135374650).

The "From" field contains the originating mobile station's SIP address (sip:sanyoptt36@ptt.sprintpcs.com), a tag parameter used for identification purposes (tag=40E24B35), and the originating mobile station's MDN (mdn=9135114650).

The "Expires" field specifies the number of seconds (11) for which the request is valid.

The "Timestamp" filed describes when the originating mobile station transmitted the request.

The "Call-ID" field contains a globally unique identifier for the PTT session (0001E894@63.168.237.92) that is used to link this INVITE message with one or more subsequent INVITE-C messages. In this example, the linking identifier includes a random string generated by the originating mobile station (0001E894) in combination with the originating mobile station's IP address (63.168.237.92). However, the linking identifier could be formulated in other ways.

The "CSeq" field contains information used to determine the proper sequencing of messages that contain the same Call-ID.

The "App-ID" identifies a PTT application for the requested communication session.

The "INVITE-C" field specifies how many INVITE-C messages will follow this message. In this case, the field indicates that one INVITE-C message will follow.

The following is an example of an INVITE-C that could follow the initial INVITE message:

---

INVITE-C 1/1
Call-ID: 0001E894@63.168.237.92
Contact:
<sip:sanyoptt36%40ptt.sprintpcs.com@63.168.237.92;tok=1/com.sprintpc -continued

```
s/1>
Content-Type: application/sdp
Proxy-Authorization: Digest
username="sanyoptt36@ptt.sprintpcs.com",realm="sprintpcs.com",nonce
="fFFzjuGkPwYz0QEuav+TtA==_92f16",response="E2562E909ACD78
3D59A4E6F5861DEEBD",uri=tel:9135374650
Content-Length: 122
v=0
o=CM 1600 0 IN IP4 63.168.237.92
s=CM
c=IN IP4 63.168.237.92
t=0 0
m=audio 1600 RTP/AVP 97
a=rtpmap:97 EVRC/4000
```

The information contained in this exemplary INVITE-C message is described below.

The first line of the message contains the method name (INVITE-C) followed by an indication (1/1) that this is the first INVITE-C message out of a total of one INVITE-C message.

The "Call-ID" contains the same linking identifier as in the original INVITE message.

The "Contact" field includes the originating mobile station's SIP address (sip: sanyoptt36%40ptt.sprintpcs.com@63.168.237.92) and a tokenization capability parameter (tok=1/com.sprintpcs/1).

The "Content-Type" field indicates the media type (application) and the subtype (sdp) of the message-body included in this message.

The "Proxy-Authorization" field identifies the originating mobile station to a proxy that requires authentication. In particular, the field consists of credentials containing the originating mobile station's authentication information.

The "Content-Length" field indicates the size of the message-body included in this message.

Following the "Content-Length" field is the message-body itself. In this case, the message-body contains session description information encoded using the Session Description Protocol.

The "v=" field gives the version of the Session Description Protocol.

The "o=" field includes the originator of the session (CM), a session id (1600), session version number (0), network type (IN), address type (IP4), and the originating mobile station's IP address (63.168.237.92).

The "s=" field identifies the session name.

The "c=" field gives the network type (IN), address type (IPv4), and connection address (63.168.237.92).

The "t=" field specifies the start and stop times of the session.

The "m=" field includes a media description, namely, the media type (audio), the port to be used for the media stream (1600), transport protocol (RTP/AVP), and payload type (97).

The "a=" field includes additional information for the RTP media stream, namely, payload type (97), type of audio encoding (EVRC), and clock rate (/4000).

It is to be understood that this segmentation of information is exemplary only. The INVITE and INVITE-C messages could contain different types of information than described above. Moreover, more than one INVITE-C message could be used to carry the information.

The information that a destination mobile station receives could also be segmented in a similar manner, i.e., an INVITE message that is followed by an INVITE-C message. The formats of these messages could be similar to that described above for the INVITE and INVITE-C messages transmitted by the originating mobile station. Thus, the destination mobile station may initially receive an INVITE message containing only minimal information and then receive an INVITE-C message containing session description information and/or other information.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   an originating mobile station transmitting an initial message, said initial message requesting establishment of a communication session involving said originating mobile station and a destination mobile station, wherein said initial message includes an identification of said originating mobile station, an identification of said destination mobile station, a linking identifier, and an indication of a number of one or more additional messages relating to said communication session that will follow said initial message; and
   after transmitting said initial message, said originating mobile station transmitting said one or more additional messages relating to said communication session, wherein each of said one or more additional messages includes said linking identifier, and wherein at least one of said one or more additional messages includes session description information that was not included in said initial message.

2. The method of claim 1, further comprising:
   said originating mobile station receiving a response message indicating that said communication session has been accepted.

3. The method of claim 2, wherein said originating mobile station transmits at least one of said one or more additional messages before receiving said response message.

4. The method of claim 2, wherein said initial message is a Session Initiation Protocol (SIP) INVITE message.

5. The method of claim 4, wherein said response message is a SIP 200 OK message.

6. The method of claim 1, wherein said communication session is a push-to-talk (PTT) session.

7. The method of claim 1, wherein a Session Description Protocol (SDP) encoding is used for said session description information.

8. The method of claim 1, wherein said session description information includes one or more parameters relating to media to be exchanged during said communication session.

9. The method of claim 8, wherein said one or more parameters includes at least one of a media type, a port to be used for said media, a transport protocol, and a payload type.

10. The method of claim 1, wherein at least one of said one or more additional messages includes authentication information that was not included in said initial message.

11. The method of claim 1, further comprising:
    said originating mobile station generating said linking identifier.

12. The method of claim 11, wherein said linking identifier includes a random string in combination with an Internet Protocol (IP) address of said originating mobile station.

13. A method, comprising:
    a destination mobile station receiving an initial message, said initial message requesting establishment of a communication session involving said destination mobile station and an originating mobile station, wherein said initial message includes an identification of said originating mobile station, an identification of said destination mobile station, a linking identifier, and an indication of a number of one or more additional messages relating to said communication session that will follow said initial message; and after receiving said initial message, said destination mobile station receiving said one or more additional messages relating to said communication session, wherein each of said one or more additional messages includes said linking identifier, and wherein at least one of said one or more additional messages includes session description information that was not included in said initial message.

14. The method of claim 13, further comprising:
said destination mobile station transmitting a response message indicating acceptance of said communication session before receiving said one or more additional messages.

15. The method of claim 14, wherein said initial message is a Session Initiation Protocol (SIP) INVITE message.

16. The method of claim 15, wherein said response message is a SIP 200 OK message.

17. The method of claim 13, wherein said communication session is a push-to-talk (PTT) session.

18. The method of claim 13, wherein said session description information includes one or more parameters relating to media to be exchanged during said communication session.

19. The method of claim 18, wherein said one or more parameters includes at least one of a media type, a port to be used for said media, a transport protocol, and a payload type.

20. The method of claim 13, wherein at least one of said one or more additional messages includes authentication information that was not included in said initial message.

* * * * *